April 19, 1927.
B. VOLKMAR
1,625,001
TIMER FOR INTERNAL COMBUSTION ENGINES
Filed May 17, 1922
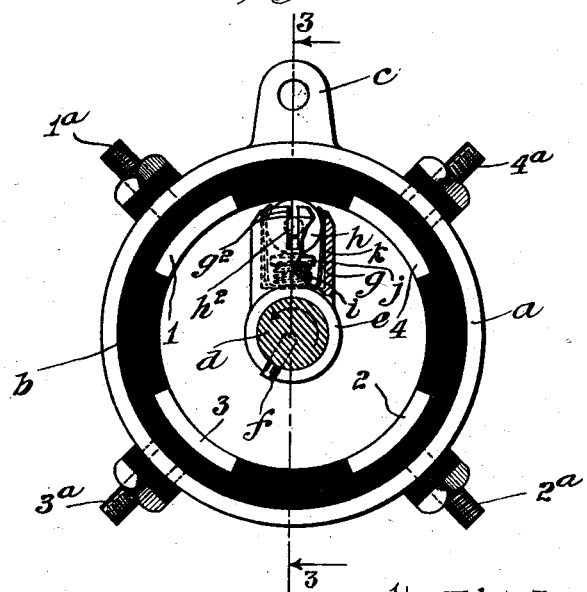
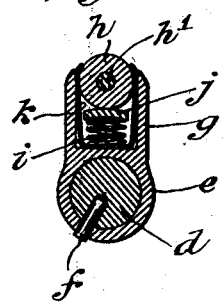
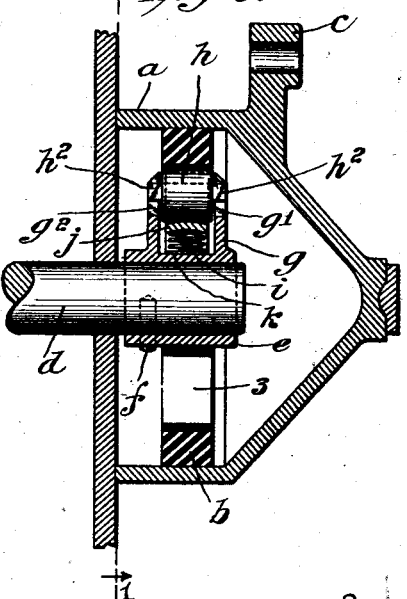
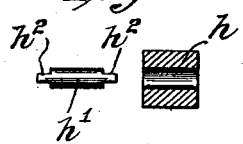
Bernhard Volkmar INVENTOR
BY Frank P. Wentworth
his ATTORNEY Patented Apr. 19, 1927.

1,625,001

UNITED STATES PATENT OFFICE.

BERNHARD VOLKMAR, OF NEW YORK, N. Y.

TIMER FOR INTERNAL-COMBUSTION ENGINES.

Application filed May 17, 1922. Serial No. 561,601.

My invention relates to improvements in the type of timer described in my co-pending application Serial No. 429,315, which timer consists specifically of a hub having a radially extending housing containing therein a cylindrical roller brush thrust toward the commutator by a spring, and a bearing plate between the spring and the roller, hardened wear surfaces being provided for the portion of the housing with which the roller contacts.

Timers for internal combustion engines are subjected to severe wear by reason of their high speeds and prolonged use, experience having demonstrated that in the type of timer described in my aforesaid application, the life of the timer is somewhat shortened because of wear upon the outer surface of the brush as well as upon the wall of the housing with which it engages.

While in actual practice such timers have given satisfactory results, and their use has extended into the thousands, I have by my present invention provided a structure wherein the wear upon the roller brush will be so distributed as to materially increase its life, and of the brush unit in its entirety without interfering with that reliability of action resulting from the tendency of the cylindrical roller to be continuously engaged with the commutator ring under the combined action of the spring within the housing and centrifugal force while the timer is in operation.

I secure the desired results by mounting the roller bearing upon a bearing pin or shaft which is slidably mounted in the walls of the housing so as to be capable of having movement towards the commutator with the roller until considerable wear has occurred upon the co-acting bearing surfaces of the roller and its shaft. Until such wear occurs, the shaft will hold said roller out of engaging relation with the wear plate carried by the housing, thus limiting the initial wear upon the roller to that resulting from the engagement with the commutator ring, but when looseness occurs between said roller and its bearing pin or shaft, permitting said roller to engage said wear plate so as to cause wear thereafter to occur only upon the periphery of the roller until the roller again engages its shaft. In this manner, which causes a shifting of the axis of rotation of the roller as a result of wear between it and its bearing pin and results in the alternate bearing of the roller upon its shaft and upon the wall of the housing, I am enabled to more than double the life of the timer.

The invention consists primarily in a timer for internal combustion engines embodying therein the combination with a commutator ring having a sequence of spaced contacts and substantially flush interposed insulated sections presented inwardly of said ring, of a brush adapted to be rotated in synchronism with the engine shaft, consisting of a hub, a radially extending housing having parallel side walls with oppositely disposed elongated openings therein extending radially of said hub, a bearing shaft slidably mounted in said openings, a substantially cylindrical contact roller rotatably mounted upon said shaft and slidably mounted within said housing with its sides in substantial engagement with said side walls, whereby continued wear will be distributed between said roller and said shaft, and between the perimeter of said roller and the wall of said housing, a spring in said housing having a normal tendency to thrust said roller through and beyond the open end of said housing, and a wear plate slidably mounted within said housing below said shaft and positioned between said spring and said roller, whereby scoring of the surface of said roller by said spring is prevented, said spring being held under tension by the engagement of said roller with said commutator ring; and in such other novel features of construction and combination of parts as are hereinafter set forth and described, and more particularly pointed out in the claims hereto appended.

Referring to the drawings,

Fig. 1 is an elevation of a commutator ring and a brush embodying my invention associated therewith, taken on the line 1—1 of Fig. 3, a portion of the housing of the brush being broken away;

Fig. 2 is a detail vertical section through the brush;

Fig. 3 is a section on the line 3—3 of Fig. 1; and

Fig. 4 is an exploded view of the roller and its shaft.

Like letters refer to like parts throughout the several views.

In the embodiment of my invention shown in the drawings, *a* indicates an old and well-known construction of commutator housing carrying a commutator ring provided with the contact segments 1, 2, 3 and 4, each having associated therewith the usual binding post 1*a*, 2*a*, 3*a* and 4*a*. Said segments and said binding posts are insulated from each other and from the housing *a* by suitable insulating material including a ring *b* which is recessed to receive said contact segments. Said housing and its commutator are adapted to be oscillated by means of a suitable lever system connected with the lug *c* to advance or retard the spark. This general construction and arrangement is old and well known in the art and no claim of invention is made thereto.

Associated with said commutator is a brush mechanism which is rotated in synchronism with the engine shaft, preferably by being mounted upon an extension thereof, which is indicated at *d* in the drawings.

This brush comprises a hub *e* having a suitable slot therein adapted to co-operate with a pin *f* upon the shaft *d* so as to facilitate the mounting and removing of the brush with relation to the shaft to cause it to rotate therewith.

The hub *e* is provided with a radially extended housing *g*, the open top of which terminates adjacent the commutator ring, sufficient clearance being afforded to avoid possible contact of the end of the housing with said commutator.

The chamber of the housing *g* is rectangular in section and the opposite sides thereof are provided with rectilineally arranged slots $g'$—$g^2$ extending radially of the hub *e* and opening outwardly of said housing at one end thereof to facilitate the assembling of the timer. The chamber of the housing *g* is so formed as to accommodate a substantially cylindrical contact roller *h* which is rotatably mounted upon a bearing pin or shaft $h'$, the ends of which are slidably mounted in the slots $g'$—$g^2$ so as to permit a free movement of said shaft $h'$ and the roller *h* radially of the hub *e* with the objects of limiting the rotary movement of said roller to an axis parallel to that of said hub, permitting the roller to recede within the housing to fit the brush to the commutator ring, and compensate for irregularities in the surface of said ring, co-operating with said roller, and distributing continued wear between the co-operating bearing surface of said roller and said shaft, and between the perimeter of said roller and the wall of said housing.

It is to be observed that the initial rotation of the roller *h* will be about its shaft $h'$, but that as wear occurs upon these parts, the axis of rotation of the roller may shift as a result of the angular thrust upon the roller, so that ultimately said roller will engage with the rear wall of the housing in the direction of movement thereof. When wear occurs upon said housing the roller will again bear upon the shaft $h'$ alone, until wear upon said shaft or upon the portion of the roller bearing thereon, will again permit engagement of the perimeter of the roller with the housing, this alternate wear of parts continuing until the roller is no longer fit for service. I preferably use a bearing shaft $h'$ having flattened ends as shown at $h^2$, so as to limit the movement of this shaft within the slots $g'$—$g^2$ to a reciprocatory movement toward and from the commutator ring.

Within the housing *g* is a coiled spring *i* which is normally held under tension by the roller *h* as a result of its movement inwardly of said housing, a wear plate *j* being interposed between said spring and the perimeter of said roller to avoid abrasion of the contact surface of said roller from the end of the tempered spring.

The spring *i* has sufficient strength to maintain the roller in constant, continuous engagement with the commutator ring, thus preventing jars or jolts occasioned by the passage of a vehicle over rough roads, from causing the roller to recede from the ring to prevent the closing of, or interrupt the circuit, as determined by the relation of the contact segments 1, 2, 3 or 4 to the pistons of the different cylinders to be fired by the closing of the circuit through said contacts. The roller *h* and shaft $h'$ possess so little weight in themselves that they will have little tendency to move against the tension of said spring as a result of jars or jolts upon the vehicle, the tendency toward displacement of the roller inwardly of the housing against the tension of said spring by such jolts and jars being further minimized by the action of centrifugal force.

The housing *g* for convenience of manufacture has been made of soft metal, and since wear will occur upon the rear wall of this chamber, after the timer has been in use for a considerable time as heretofore stated, I provide a wear plate in the form of a U-shaped spring *k* adapted to receive between its arms, the spring *i*, wear plate *j* and roller *h* with its shaft $h'$, which will reduce wear at this point and will also facilitate the assembling of the timer. By slightly crimping the ends of the arms of this spring inwardly as shown, said roller and its shaft will be held against displacement in the assembled structure, these inturned edges not interfering with the free rotation of the roller, since under normal conditions the roller will be pressed within the chamber sufficiently to ensure contact of the perimeter thereof with one arm of the spring *k* well below said crimped portion.

The operation of the herein described timer is substantially as follows:—

In assembling the brush in a timer, the casing $a$ is removed and the hub $e$ mounted upon the shaft $d$ by means of the pin $f$, said housing and its commutator ring being then replaced, the roller $h$ being depressed against the tension of the spring $i$ so as to bring this roller within and in engagement with the operative surface of said ring, and with the shaft $h'$, which shaft will have movement in the slots $g'$—$g^2$ with the depression of said roller against the tension of the spring $i$. A loose running fit is provided between the roller $h$ and its shaft $h'$, and between the ends of the roller and the side walls of the housing, thus avoiding any necessity for lubrication and ensuring against the development of an oil film upon the contacts 1, 2, 3 and 4.

When the spring $i$ is tensioned in the manner above described, it will force the roller $h$ and its shaft $h'$ outwardly with sufficient force to maintain said roller in constant engagement with the commutator ring so as to ensure accuracy in the timing of the ignition of the explosive charge in the respective engine cylinders, and maintain the circuit closed for a period determined by the length of each contact segment. I have found in actual practice that severe jarring of the vehicle will have no tendency to cause the disengagement of said roller from the commutator ring and that a roughened surface of said ring will not interfere in any way with the timely making and maintenance of a perfect contact. In fact I have found, when using a brush made in accordance with my invention, with a badly corrugated commutator ring, that there was not only no loss of, nor interruption in, the contact, but that with a continued running of the engine, the ring will be brought to a true smooth surface.

The constant thrust of the spring $i$ and the constant engagement of the wear plate $j$ with the roller $h$ as a result of such thrust, ensures continuity in the ground connection through the brush and the shaft $d$, there being no possibility or likelihood of the partial or complete insulation of these parts by reason of the presence of an oil film thereon. Furthermore, the constant engagement of the roller with said wear plate and with the shaft $h'$ or with the wear plate $k$ ensures bright and clean contact areas between the roller and the conducting medium for leading the current to said shaft $d$.

As heretofore stated, the initial wear in the operation of the timer will be between the roller $h$ and its shaft $h'$, the subsequent wear being alternately upon the wear plate $k$ and upon said shaft, and upon the portions of the roller engaging therewith, thus not only distributing the wear between two areas upon said roller and between said shaft and said wear plate, but avoiding excessive wear as a result of a continued frictional engagement of the same portion of the roller with the same opposed surface.

Wear upon the roller itself will be compensated for by the action of the spring $i$ and wear plate $j$ thereon.

Aside from the added facility in assembling the timer and the distribution of wear as described to prolong its life, which conditions result from the use of the U-shaped spring $k$ and the bearing shaft $h'$, a timer embodying my invention has all of the desirable characteristics of the timer of my aforesaid application.

It is not my intention to limit the invention to the precise details of construction shown in the drawings, it being apparent that such may be varied without departing from the spirit and scope of the invention.

Having described the invention, what I claim as new and desire to have protected by Letters Patent, is:—

1. A timer for internal combustion engines embodying therein the combination with a commutator ring having a sequence of spaced contacts and substantially flush interposed insulated sections presented inwardly of said ring, of a brush adapted to be rotated in synchronism with the engine shaft, consisting of a hub, a radially extending housing having parallel side walls with oppositely disposed elongated openings therein extending radially of said hub, a bearing shaft slidably mounted in said openings, a substantially cylindrical contact roller rotatably mounted upon said shaft and slidably mounted within said housing with its sides in substantial engagement with said side walls, whereby continued wear will be distributed between said roller and said shaft, and between the perimeter of said roller and the wall of said housing, a spring in said housing having a normal tendency to thrust said roller through and beyond the open end of said housing, and a wear plate slidably mounted within said housing below said shaft and positioned between said spring and said roller, whereby scoring of the surface of said roller by said spring is prevented, said spring being held under tension by the engagement of said roller with said commutator ring.

2. A timer for internal combustion engines embodying therein the combination with a commutator ring having a sequence of spaced contacts and substantially flush interposed insulated sections presented inwardly of said ring, of a brush adapted to be rotated in synchronism with the engine shaft, consisting of a hub, a radially extending housing having parallel side walls with oppositely disposed elongated openings therein extending radially of said hub, a bearing shaft slidably mounted in said openings, a substantially cylindrical contact roller rotatably mounted upon said shaft and slidably mounted within said housing with its sides in substantial engagement with said side walls, whereby continued wear will be distributed between said roller and said shaft, and between the perimeter of said roller and the wall of said housing, a spring in said housing having a normal tendency to thrust said roller through and beyond the open end of said housing, a wear plate slidably mounted within said housing below said shaft and positioned between said spring and said roller, whereby scoring of the surface of said roller by said spring is prevented, said spring being held under tension by the engagement of said roller with said commutator ring, and a wear plate in the form of a U-shaped spring adapted to receive between its arms said spring, said wear plate and said roller with its shaft.

3. A timer for internal combustion engines embodying therein the combination with a commutator ring having a sequence of spaced contacts and substantially flush interposed insulated sections presented inwardly of said ring, of a brush adapted to be rotated in synchronism with the engine shaft, consisting of a hub, a radially extending housing having parallel side walls with oppositely disposed elongated openings therein extending radially of said hub, a bearing shaft slidably mounted in said openings, a substantially cylindrical contact roller rotatably mounted upon said shaft and slidably mounted within said housing with its sides in substantial engagement with said side walls, whereby continued wear will be distributed between said roller and said shaft, and between the perimeter of said roller and the wall of said housing, a spring in said housing having a normal tendency to thrust said roller through and beyond the open end of said housing, a wear plate slidably mounted within said housing below said shaft and positioned between said spring and said roller, whereby scoring of the surface of said roller by said spring is prevented, said spring being held under tension by the engagement of said roller with said commutator ring, and a wear plate in the form of a U-shaped spring adapted to receive between its arms said spring, said wear plate and said roller with its shaft, the ends of the arms of said U-shaped spring being crimped toward each other to facilitate the assembling of the parts of the brush with relation to each other and the brush with relation to the commutator ring.

4. A timer for internal combustion engines embodying therein the combination with a commutator ring having a sequence of spaced contacts and substantially flush interposed insulated sections presented inwardly of said ring, of a brush adapted to be rotated in synchronism with the engine shaft, consisting of a hub, a radially extending housing having parallel side walls with oppositely disposed elongated openings therein extending radially of said hub, having their ends opening outwardly of said housing, a bearing shaft slidably mounted in said openings, a substantially cylindrical contact roller rotatably mounted upon said shaft and slidably mounted within said housing with its sides in substantial engagement with said side walls, whereby continued wear will be distributed between said roller and said shaft, and between the perimeter of said roller and the wall of said housing, a spring in said housing having a normal tendency to thrust said roller through and beyond the open end of said housing, and a wear plate slidably mounted within said housing below said shaft and positioned between said spring and said roller, whereby scoring of the surface of said roller by said spring is prevented, said spring being held under tension by the engagement of said roller with said commutator ring.

5. A timer for internal combustion engines embodying therein the combination with a commutator ring having a sequence of spaced contacts and substantially flush interposed insulated sections presented inwardly of said ring, of a brush adapted to be rotated in synchronism with the engine shaft, consisting of a hub, a radially extending housing having parallel side walls with oppositely disposed elongated openings therein extending radially of said hub, having their ends opening outwardly of said housing, a bearing shaft slidably mounted in said openings, a substantially cylindrical contact roller rotatably mounted upon said shaft and slidably mounted within said housing with its sides in substantial engagement with said side walls, whereby continued wear will be distributed between said roller and said shaft, and between the perimeter of said roller and the wall of said housing, a spring in said housing having a normal tendency to thrust said roller through and beyond the open end of said housing, a wear plate slidably mounted within said housing below said shaft and positioned between said spring and said roller, whereby scoring of the surface of said roller by said spring is prevented, said spring being held under tension by the engagement of said roller with said commutator ring, and a wear plate in the form of a U-shaped spring adapted to receive between its arms said spring, said wear plate and said roller with its shaft, the ends of the arms of said U-shaped spring being crimped toward each other to facilitate the assembling of the parts of the brush with relation to each other and the brush with relation to the commutator ring.

6. A timer for internal combustion engines embodying therein the combination with a commutator ring having a sequence of spaced contacts and substantially flush interposed insulated sections presented inwardly of said ring, of a brush adapted to be rotated in synchronism with the engine shaft, consisting of a hub, a radially extending housing having parallel side walls with oppositely disposed elongated openings therein extending radially of said hub, having their ends opening outwardly of said housing, a bearing shaft having flattened ends slidably mounted in said openings whereby said shaft is limited to a reciprocatory movement toward and from said ring, a substantially cylindrical contact roller rotatably mounted upon said shaft and slidably mounted within said housing with its sides in substantial engagement with said side walls, whereby continued wear will be distributed between said roller and said shaft, and between the perimeter of said roller and the wall of said housing, a spring in said housing having a normal tendency to thrust said roller through and beyond the open end of said housing, and a wear plate slidably mounted within said housing below said shaft and positioned between said spring and said roller, whereby scoring of the surface of said roller by said spring is prevented, said spring being held under tension by the engagement of said roller with said commutator ring.

7. A timer for internal combustion engines embodying therein a brush consisting of a hub adapted to be detachably mounted upon a shaft, a radially extending housing having parallel side walls, there being rectilineally arranged, elongated slots in said side walls respectively, a shaft mounted to have reciprocatory movement in said slots, a substantially cylindrical contact roller rotatably mounted upon said shaft and slidably mounted within said housing with its sides in substantial engagement with said side walls, whereby continued wear will be distributed between said roller and said shaft and between the perimeter of said roller and the wall of said housing, and electroconductive means yieldably thrusting said roller and its shaft outwardly of said hub, whereby said roller is permitted to rotate about a variable axis, and presents a wide contact area to its cooperating commutator ring, said slidable shaft, the wall of said housing and said electro-conductive means.

In witness whereof I have hereunto affixed my signature this 15th day of May, 1922.

BERNHARD VOLKMAR.